United States Patent

Ziemann et al.

Patent Number: 5,583,849
Date of Patent: Dec. 10, 1996

[54] METHOD AND CIRCUIT ARRANGEMENT FOR TRANSMITTING MESSAGE CELLS VIA VIRTUAL PATHS OF AN ATM COMMUNICATION SYSTEM

[75] Inventors: Klaus Ziemann, Germering; Franz-Josef Schaefer, Ottobrunn, both of Germany

[73] Assignee: Siemens Aktiengesellschaft, Munich, Germany

[21] Appl. No.: 303,634

[22] Filed: Sep. 9, 1994

[30] Foreign Application Priority Data

Sep. 27, 1993 [DE] Germany .......................... 43 32 824.5

[51] Int. Cl.⁶ .................................. H04J 3/14; H04L 1/22
[52] U.S. Cl. .................................. 370/397; 370/224
[58] Field of Search ............................ 370/16, 16.1, 94.2, 370/94.1, 60, 60.1; 395/182.01, 182.02

[56] References Cited

U.S. PATENT DOCUMENTS

| | | | |
|---|---|---|---|
| 5,150,356 | 9/1992 | Tsutsui | 370/16.1 |
| 5,301,189 | 4/1994 | Schmidt et al. | 370/60.1 |
| 5,307,353 | 4/1994 | Yamashita et al. | 370/16.1 |
| 5,390,174 | 2/1995 | Jugel | 370/94.1 |
| 5,425,024 | 6/1995 | Hummel | 370/94.1 |
| 5,490,138 | 2/1996 | Niestegge et al. | 370/56 |

FOREIGN PATENT DOCUMENTS 0579980  1/1994  European Pat. Off. .
3136128  4/1942  Germany .

Primary Examiner—Douglas W. Olms
Assistant Examiner—Min Jung
Attorney, Agent, or Firm—Hill, Steadman & Simpson

[57] ABSTRACT

An ATM communication system (ATMK) has communication equipment (K1, K2, K3) that are arranged in a ring circuit system (RS) formed of two ring circuits (RING0, RING1) operated in opposite directions. Ring loops can thereby be established via the communication equipment in order to be able to switch from an active path to an alternate path as needed in the transmission of message cells. In the respective communication equipment, the message cells are respectively preceded by an internal cell header wherein, among other things, a path-associated sequence number is contained. Over and above this, the sequence number anticipated next or, respectively, the sequence number that most recently appeared is retained and path-associated in the respective communication equipment. Upon establishment or, respectively, clear down of a ring loop, the retained sequence number coming into consideration is updated while forwarding the message cell on the basis of the sequence number of the next message cell of the respective path to arrive. Following message cells of the same path are only forwarded when the sequence number respectively contained in these corresponds to the retained sequence number.

12 Claims, 3 Drawing Sheets

METHOD AND CIRCUIT ARRANGEMENT FOR TRANSMITTING MESSAGE CELLS VIA VIRTUAL PATHS OF AN ATM COMMUNICATION SYSTEM

BACKGROUND OF THE INVENTION

The present invention is directed to a method and to a circuit arrangement for transmitting message cells via virtual paths of an asynchronous transfer mode (ATM) communication system. One such method and circuit arrangement has already been proposed by European Patent Application 93 110 320.4 (corresponding to U.S. Pat. No. 089,554, filed Jul. 12, 1993). The only thing set forth in this European patent application is that an alternate path is set up for each virtual path, this alternate path proceeding in the opposite direction and being used given outage of the regular virtual path. How such a switching can be implemented, however, is not discussed.

SUMMARY OF THE INVENTION

It is an object of the present invention to provide a method and circuit arrangement for implementing a switching from an active path to an alternate path with little control outlay or, respectively, circuit-oriented outlay.

In general terms the present invention is a method for transmitting message cells over virtual paths that are established between communication equipment of an ATM communication system working according to an asynchronous transfer mode. The communication equipment are arranged in a ring circuit system formed of two ring circuits operated in opposite directions and divide this ring circuit system into ring sections. An active path is established for the respective virtual path over one of the ring circuits and an alternate path for the respective virtual paths is established over the remaining ring circuit. The respective communication equipment can establish a ring loop between the respective active path and the alternate path allocated thereto. A respective expanded cell header is placed preceding the message cells to be transmitted over the respective virtual path within the respective communication equipment, a path identifier indicating the respective virtual path as well as a sequence number that changes continuously from message cell to message cell of the respective virtual path, being contained in this expanded cell header. The sequence number anticipated as a next sequence number or, respectively, the sequence number that most recently appeared is respectively retained in the communication equipment under the respective path identifier. In response to the establishment or, respectively, clear down of a ring loop by one of the communication equipment, this communication equipment forwards the first message cell arriving thereafter under the respective path identifier while updating the retained sequence number according to the criterion of the sequence number contained in the associated first message cell. Message cells following the appertaining, first message cell under the same path identifier are only respectively formed by the respective communication equipment when the sequence number contained in the respective message cell corresponds to the sequence number retained under the path identifier or, respectively, corresponds to the retained sequence number incremented by 1. The advantage of the present invention is that, given an establishment or, respectively, clear down of a ring loop by the first message cell appearing thereafter on the virtual path affected by this ring loop, the sequence number retained in the respective communication equipment is synchronized to the sequence number contained in the appertaining message cell. It is assured in this way that the message cell of the respective virtual path following this first message cell can be forwarded without cell loss.

An especially low control outlay for the transmission of message cells within the ring system is achieved as follows. A first comparison bit for the individual virtual paths and a path-independent, second comparison bit are retained in the respective communication equipment in addition to the sequence number. The first comparison bit and the second comparison bit are first uniformly set to a defined logical level. The second comparison bit is inverted with every establishment or, respectively, clear down of a ring loop by the respective communication equipment. The first comparison bit coming into consideration is selected in the respective communication equipment given the appearance of a message cell based on the criterion of the path identifier contained in the appertaining cell header and is compared to the second comparison bit. Given a non-identity of the comparison bits compared to one another, the appertaining message cell is evaluated as a first message cell of the respective virtual path and is forwarded while updating the sequence number retained in the respective communication equipment and while setting the logical level of the first comparison bit to the logical level of the second comparison bit. Given identity of the comparison bits compared to one another, the appertaining message cell is only forwarded while updating the sequence number retained in the respective communication equipment when the sequence number contained in the associated message cell corresponds to the sequence number initially retained under the path identifier or, respectively, corresponds to the retained sequence number incremented by 1.

The expanded cell headers for the individual, active paths and alternate paths are offered at the respective input of each of the communication equipment. The path-associated sequence numbers and first comparison bits as well as the path-independent second comparison bit are retained at the respective output of each of the communication equipment. The comparisons of the comparison bits and sequence numbers are implemented.

When active paths are conducted over both ring circuits of the ring circuit system, a marking from which it proceeds whether the respective virtual path is used as active path or as alternate path is additionally retained at the respective output of each of the communication equipment for each of the virtual paths and a path-independent loop information for identifying an established, respectively, cleared down ring loop is retained at the respective output of each of the communication equipment. Given a non-identity of two comparison bits compared to one another and given an established ring loop marked by the loop information, the message cell present at the moment is only handled as first message cell of the respective virtual path when this virtual path is defined by its marking as an alternate path. Given a non-identity of two comparison bits compared to one another and given a cleared down ring loop marked by the loop information, the message cell present at the moment is only handled as a first message cell of the respective virtual path when this virtual path is defined by its marking as an active path.

The respective communication equipment establishes or, respectively, in turn clears down a ring loop given a non-availability or, respectively, a reavailability of a ring section connection to the respective communication equipment, establishing or, respectively, in turn clearing down this ring loop under the control of a control means.

The respective communication equipment establishes or, respectively, in turn clears down a ring loop in response to a control signal output by a control means.

In a circuit arrangement for implementing the above-described message, the communication equipment are each respectively fashioned such that an expanded cell header wherein a path identifier identifying the respective virtual path as well as a sequence number that changes continuously from message cell to message cell of the respective virtual path respectively precedes the message cells to be transmitted via the respective virtual path within the respective communication equipment. The sequence number anticipated next or, respectively, the sequence number that most recently appeared is respectively retained in the communication equipment under the respective path identifier. In response to the establishment or, respectively, clear down of a ring loop by one of the communication equipment, this communication equipment forwards the first message cell arriving thereafter under the respective path identifier while updating the retained sequence number based on the criterion of the sequence number contained in the associated first message cell. Message cells following the associated first message cell under the same path identifier are only respectively forwarded by the respective communication equipment when the sequence number contained in the respective message cell corresponds to the sequence number retained under the path identifier or, respectively, to the retained sequence number incremented by 1. The advantage of this circuit arrangement that a loss-free transmission of message cells within the ring system upon establishment or, respectively, clear down of ring loops can be achieved with relatively little circuit-oriented outlay.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
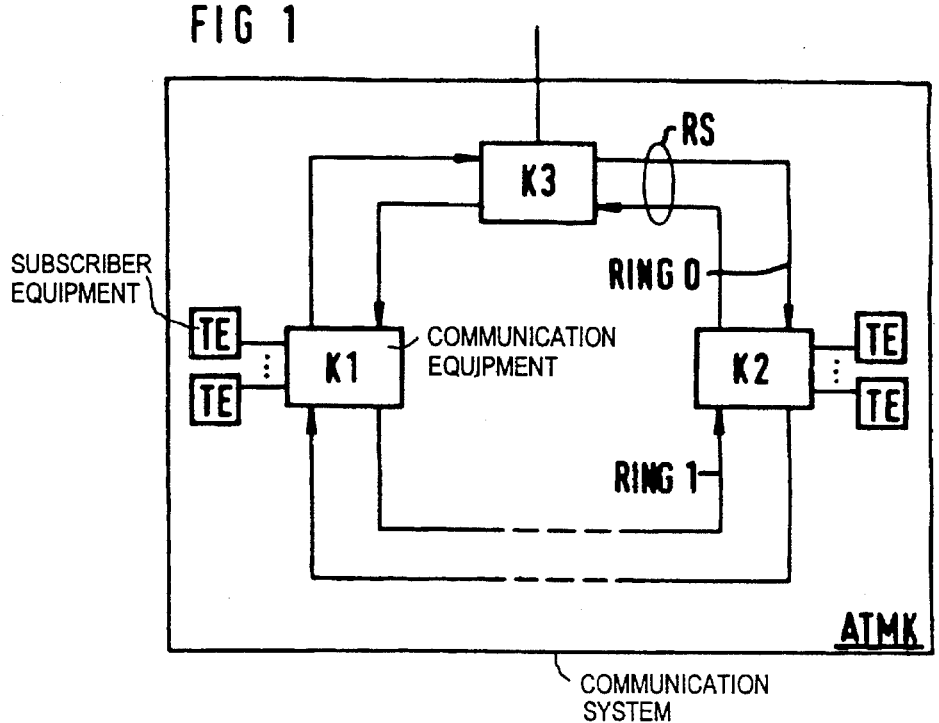
FIG. 1 shows a block circuit diagram of an ATM communication system formed of a ring system wherein the invention is employed.
Figure 2:
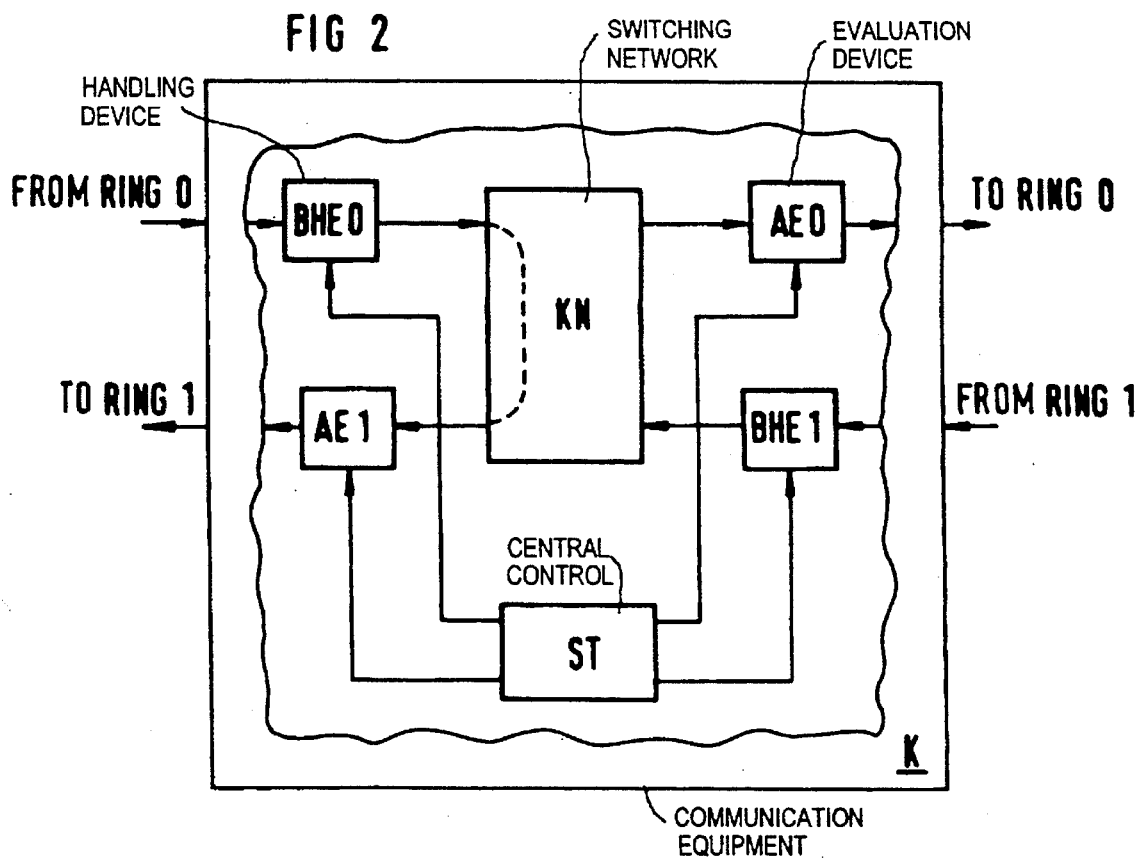
FIG. 2 shows a block circuit diagram of a communication equipment that is only schematically shown in FIG. 1.

FIG. 1 schematically shows an ATM communication system ATMK functioning according to an asynchronous transfer mode which has a plurality of communication equipment arranged in a ring system RS. Only three of these communication equipment K1, K2 and K3 are shown in FIG. 2. Let the communication equipment K1 and K2, for example, be concentrators to which a plurality of subscriber equipment TE or, respectively, a plurality of equipment connected to subscriber lines are respectively connected. By contrast, let the communication equipment K3 be an ATM switching equipment via which the ATM communication system ATMK shown in FIG. 1 is connected, for example to further communication systems or, respectively, communication equipment that are not shown in FIG. 1.

Virtual paths via which a plurality of virtual connections can respectively proceed are established at least semi-permanently within the ring circuit system RS, which is formed of two oppositely operated ring circuits RING0 and RING1 and which is subdivided into ring sections by the communication equipment K1, K2 and K3. Over and above this, a virtual alternate path is established for each of these active paths, this virtual alternate path proceeding in the opposite direction and being used for the transmission of message cells given outage of the active path. The switch from an active path to the appertaining alternate path thereby ensues on the basis of a ring loop established by one of the communication equipment with which the outer ring circuit RING0 shown in FIG. 1 is connected to the inner ring circuit RING1. Dependent on the outage situation, moreover, a respective ring loop can be established within the ring circuit system RS by a plurality of communication equipment.

The message cells of the individual virtual paths transmitted within the ring circuit system RS each respectively comprised an external cell header according to the ATM transmission principle having a path identifier that identifies the respective virtual path. For the transmission within the communication equipment K1, K2 and K3, this is additionally preceded by an internal cell header that forms an expanded cell header together with the external cell header. Contained therein, among other things, is a sequence number continuously modified from message cell to message cell of the respective virtual path. The sequence numbers are offered by the respective communication equipment. Moreover, the sequence number anticipated as next sequence number under the respective path identifier in a message cell is retained in the communication equipment. Alternatively thereto, however, the sequence number that most recently appeared in a message cell can also be retained. The respective communication equipment thereby only onwards a message cell where the sequence number contained in the respective message cell corresponds to the sequence number retained under the appertaining path identifier or, respectively, to the retained sequence number incremented by 1.

When a ring loop is then established or, respectively, in turn cleared down by a communication equipment, then this communication equipment onwards the first message cell arriving under the respective path identifier without the aforementioned check and thereby updates the sequence number retained under the path identifier coming into consideration based on the criteria of the sequence number contained in the appertaining message cell, that is, the sequence number is synchronized to the sequence number just received. The message cells of the respective virtual path following the appertaining, first message cell are then only forwarded when the sequence number contained in the respective message cell corresponds to the sequence number retained under the path identifier or, respectively, to the retained sequence number incremented by 1.

FIG. 2 shows one of the communication equipment K1, K2 and K3 shown in FIG. 1 in greater detail. This is referenced K in FIG. 2. According thereto, the input side of the communication equipment is connected via a handling means BHE0 to the ring circuit RING0. Upon arrival of a message cell, this handling means BHE0 offers an internal cell header stored under the appertaining path identifier on the basis of the external cell header belonging to the message cell. This internal cell header thereby contains the aforementioned sequence number and forms the aforementioned, expanded cell header together with the external cell header.

This internal cell header is placed preceding the message cell just accepted in order to transmit this via a switching network KN that follows the handling means BHE0. At its output side, this switching network KN is in communication with the ring circuit RING0 via an evaluation means AE0. In a normal case, that is, when a ring loop is not established, the message cells supplied to the communication means K via the ring circuit RING0 are forwarded thereover. This forwarding thereby ensues according to the criterion of the aforementioned evaluation of the sequence numbers that shall be set forth in greater detail below.

In a corresponding way, the switching network KN has its input side connected to the ring circuit RING1 via a handling means BHE1 and via an evaluation means AE1, this ring circuit RING1 being operated opposite the ring circuit RING0.

The switching network KN as well as the aforementioned handling means and evaluation means are controlled by a central control means ST under whose control a ring loop can also be established or, respectively, cleared down. Such a ring loop is indicated in FIG. 2 with a broken-line curve.

Figure 3:
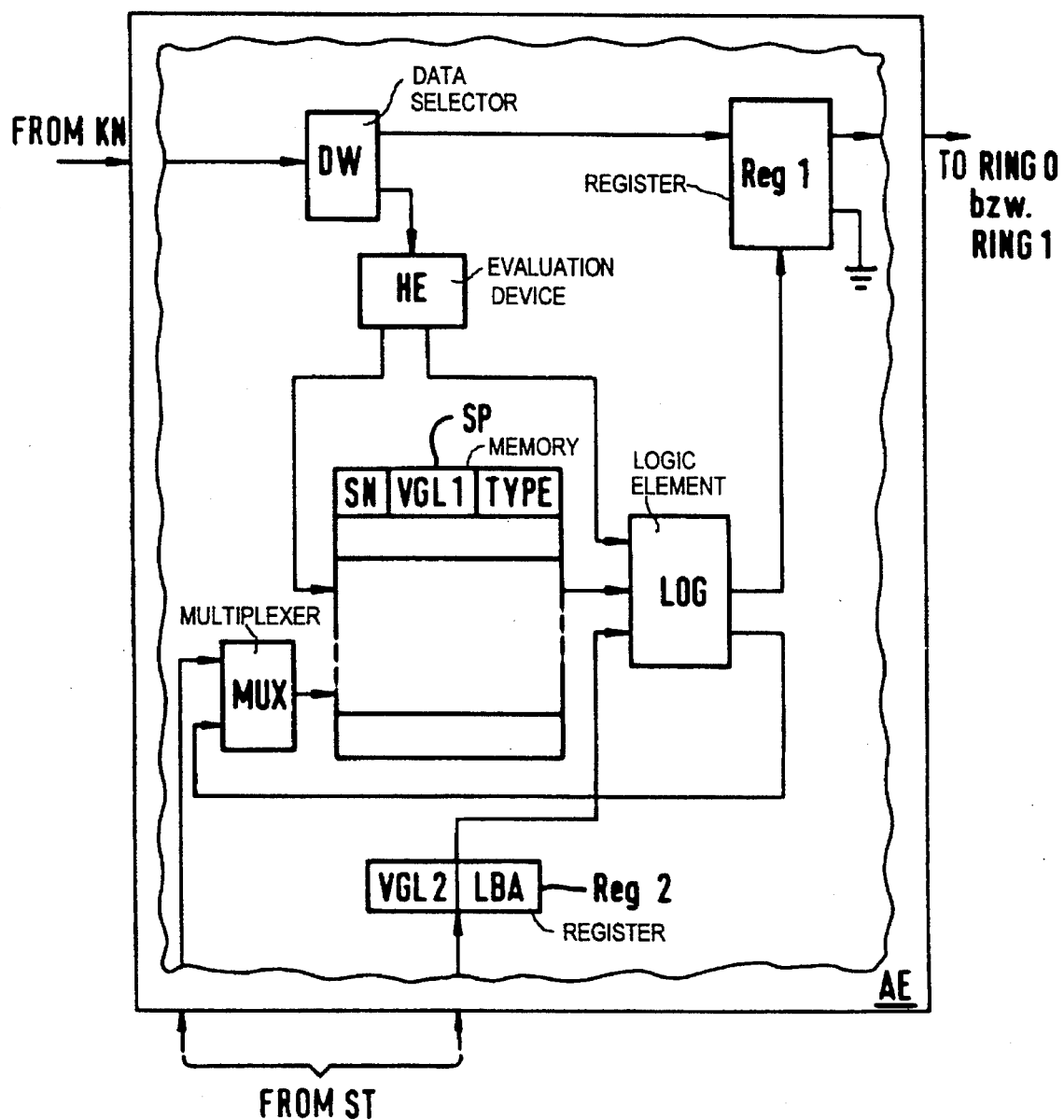
FIG. 3 shows a block circuit diagram of an evaluation equipment only shown schematically in FIG. 2.

FIG. 3 shows portions of the structure of one of said evaluation means. This evaluation means referenced AE has a data selector DW at its input side which accepts the message cells output successively proceeding from the appertaining switching network KN (FIG. 2) and supplies these, respectively, including the appertaining external cell header, to a storage register Reg1 for an intermediate storage. Additionally, the expanded cell header preceding the respective message cell is also transmitted by this data selector to a cell header evaluation means HE. Preceding from the latter, a memory SP is then selected based on the criterion of the path identifier contained in the respective, expanded cell header. This memory SP has a plurality of memory cells corresponding in number to the possible plurality of different virtual paths and, thus, of different path identifiers, these memory cells being individually selectable by the path identifiers. A sequence number SN that corresponds to the most recently received sequence number, a first comparison bit VGL1 that is initially set to a defined, logical level, for example "0", upon establishment, as well as a path particular TYPE are respectively stored in these memory cells. Whether the respective virtual path proceeding via the evaluation means represents an active path or an alternate path thereby proceeds from the path particular. For example, an active path can be identified by TYPE=0 and an alternate path, by contrast, can be identified by TYPE=1. The information stored in the individual memory cells, moreover, are entered by the central control means ST shown in FIG. 2 upon establishment of the respective virtual path. For this purpose, this central control means is in communication with the memory SP via a multiplexer MUX.

Given the selection of a memory cell by the cell header evaluation means HE, the content of this memory cell is transmitted to a logic element LOG. As further input signals, this logic element LOG receives the sequence number that is contained in the expanded cell header just evaluated by the cell header evaluation means HE, as well as the register content of a register Reg2. A path-independent, second comparison bit VGL2 as well as a loop information LBA are thereby contained in this register. The comparison bit VGL2 is thereby initially set to the same logic level (logic level "0") as the comparison bit VGL1 by the central control means ST shown in FIG. 2. The logic level of this comparison bit VGL2 is then inverted under the control of the control means ST with every establishment or, respectively, clear down of a ring loop. The loop information LBA indicates whether an establishment of a ring loop has occurred or not. For example, the establishment of a ring loop can thereby be identified by LBA=1 and the clear down of a ring loop, by contrast, can be identified by LBA=0. At the initialization, the loop information LBA is set to the value "0" by the central control means ST. This value is then inverted proceeding from the control means ST upon establishment of a ring loop. Given a clear down of this ring loop, a resetting to the initial value "0" then in turn ensues.

The logic element LOG is in communication via a control output with a control input of the aforementioned storage register Reg1. A determination is thereby made via this connection on the basis of control signals output by the logic element as to whether a message cell now stored in the storage register is to be forwarded or to be discarded. By contrast thereto, the logic element LOG is connected via a data output to the aforementioned multiplexer MUX. This connection is used in order to overwrite the sequence number stored in a memory cell of the memory SP that has just been selected with an updated sequence number.

Figure 4:
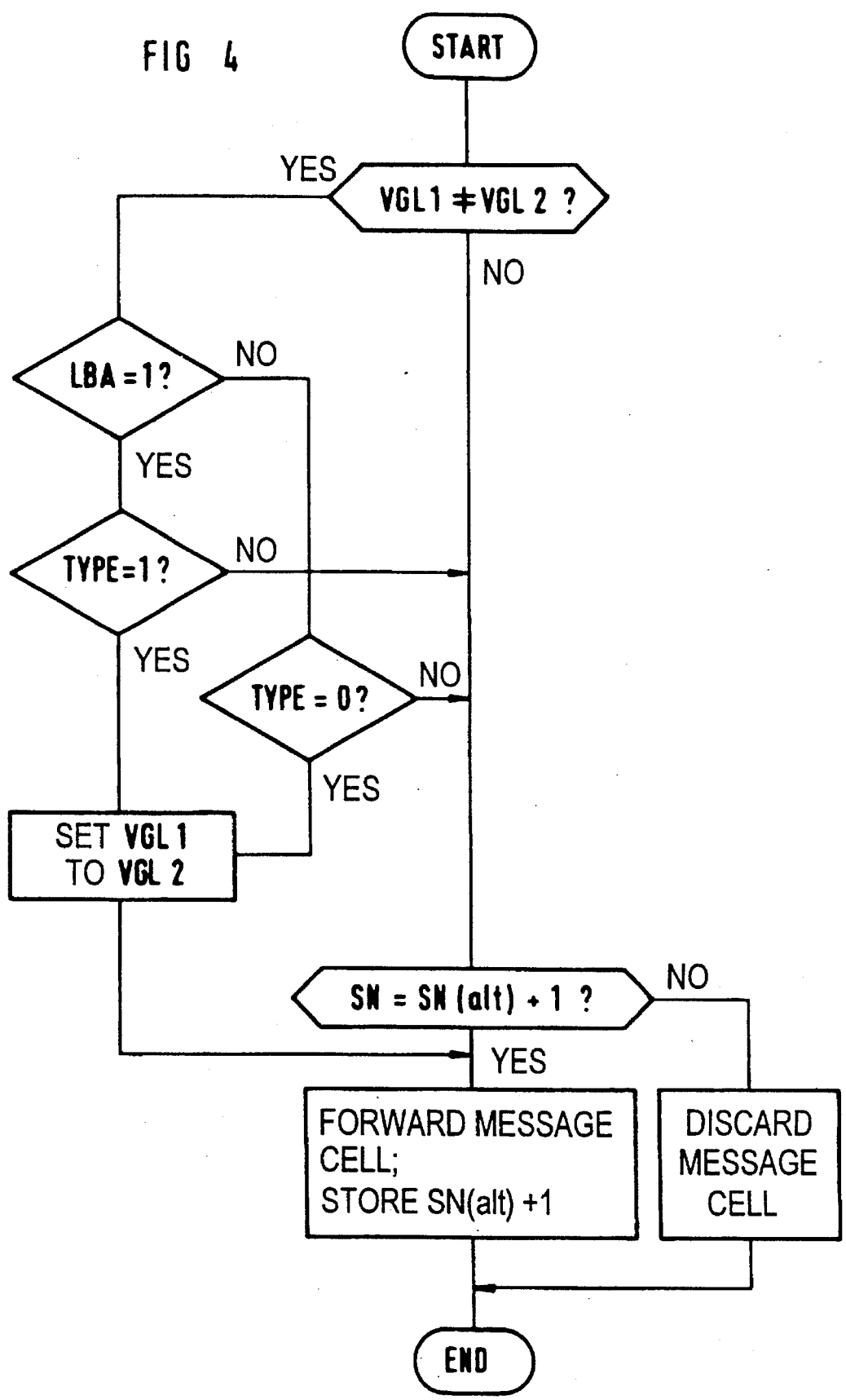
FIG. 4 shows a flow chart which shall be discussed in greater detail below.

The operation of the aforementioned input signals undertaken by the logic element LOG shall be set forth below with reference to a flow chart shown in FIG. 4. It is thereby assumed that active paths are established via both ring circuits RING0 and RING1 shown in FIG. 1. Additionally, the active paths of one ring circuit have alternate paths on the other ring circuit allocated to them. Accordingly, an aforementioned value TYPE=0 is respectively retained in the evaluation means AE0 of the communication equipment K shown in FIG. 2, for example for the active paths of the ring circuit RING0. The alternate path allocated to the respective active path, by contrast, is marked with TYPE=1 in the evaluation means AE1 belonging to the communication equipment K.

The aforementioned comparison bits VGL1 and VGL2 are first compared to one another by the logic element LOG (FIG. 3) belonging to the respective evaluation means (AE0, AE1). Given identity of these two comparison bits, a check is then carried out to see whether the sequence number contained in a message cell just received corresponds to the sequence number incremented by 1 supplied proceeding from the memory SP. When this is the case, then the logic element outputs a control signal via the aforementioned control output, in response to whose appearance the message cell intermediately stored at the moment in the storage register Reg1 shown in FIG. 3 is forwarded via the ring circuit (RING0, RING1) coming into consideration. Over and above this, a sequence number (SN(ALT)+1) is offered at said data output of the logic element, the sequence number (SN(alt)) stored in the memory cell of the memory SP that has just been selected being overwritten with this sequence number (SN(alt)+1).

When, by contrast, the aforementioned comparison shows that the sequence numbers compared to one another are not identical, then the message cell intermediately stored at the moment in the storage register are Reg1 is discarded. The sequence number hitherto stored in the memory cell of the memory SP that has just been selected thereby remains unmodified.

When the case then arises that a ring loop is established between the handling means BHE0 and the evaluation means AE1 via the switching network KN by, for example, the communication equipment K shown in FIG. 2, then, under the control of the central control means ST, the aforementioned comparison bit VGL2 stored in the register Reg2 of the evaluation means AE1 is inverted. Moreover, the loop information LBA contained in this register is set to the value "1". Since the two comparison bits VGL1 and VGL2 thus deviate from one another in the aforementioned comparison, a check is carried out on the basis of the loop information LBA=1 to see whether the message cell present at the moment belongs to an alternate path, that is, whether the value for the virtual path is set to TYPE=1. When this is the case, then the message cell present at the moment is evaluated as first message cell following the establishment of a ring loop and is forwarded without a sequence number comparison but with an updating of the sequence number stored in the memory cell of the memory SP that has just been selected. Moreover, the logic element LOG sets the logical level of the comparison bit VGL1 to the logical level of the comparison bit VGL2. The logical level stored in the memory cell of the memory SP that has just been selected is then overwritten with this logical level. Since the two comparison bits VGL1 and VGL2 are again identical for message cells of the same path following the first message cell, these message cells are subjected to a sequence number comparison in the above-recited way. Dependent on the result of the comparison, these message cells are then forwarded or discarded.

In the assumed example, the active paths proceeding via the evaluation means AE1 are marked with TYPE=0, so that the message cells belonging to these active paths are subjected to a sequence number comparison in the recited way. A forwarding or discarding of these message cells with the indicated follow-up activities then ensues dependent on the result of the comparison.

When the ring loop is then in turn cleared down by the central control means ST, then the comparison bit VGL2 stored in the appertaining register Reg2 in the evaluation means AE0 is inverted. The comparison bits VGL1 stored in the memory cells of the appertaining memory SP, by contrast, respectively comprise a logical level that corresponds to the logical level of the comparison bit VGL2 before the inversion. The bit comparison in the evaluation means AE0 given the appearance of the message cell thus shows that the comparison bit VGL1 coming into consideration therefor deviates from the comparison bit VGL2. Since the loop information is set to the value LBA=0 as an indication of a ring loop that is not present or, respectively, that has been cleared down, a check is carried out to see whether the message cell existing at the moment belongs to an active path. When this is the case, then the appertaining message cell is evaluated as first message cell of the respective active path after the clear down of the ring loop and is forwarded without a sequence number comparison but upon updating of the stored sequence number. The logical level of the comparison bit VGL1, however, is thereby set to the logical level of the comparison bit VGL2 and this level is accepted into the memory cell of the memory SP selected at the moment. Since the comparison bit VGL1 and the comparison bit VGL2 are thus respectively identical for message cells of the same active path following this first message cell, these message cells are then subjected to a sequence number comparison in the evaluation means AE0 in the above-recited way and, based on the criterion of the comparison result, are either forwarded given updating of the sequence number stored in the memory SP or are discarded without such an updating. Message cells potentially arriving from alternate paths are subjected to a sequence number comparison in the evaluation means AE1 in the same way. Such message cells can appear in the evaluation means AE1 when a ring loop was established by another communication equipment of the ring circuit system.

In conclusion, let it be pointed out that it was in fact assumed above that the most recent sequence number to appear in a message cell is stored in the respective memory cell of the memory SP for the sequence number comparison. In a departure therefrom, however, the sequence number anticipated next can be entered, this being correspondingly modified after a comparison.

Over and above this, let it also be pointed out that the interrogation of the loop information LBA and the interrogation as to whether an active path or an alternate path is present can be eliminated when active paths are conducted over only one of the ring circuits RING0 and RING1 and the remaining ring circuit is only available for alternate paths. Given inequality of the comparison bits VGL1 and VGL2 in this case, the respective message cell is evaluated as first message cell after the establishment or, respectively, clear down of a ring loop and is handled in the above-recited way without the interrogations that were just mentioned.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting message cells over virtual paths that are established between communication equipments of an asynchronous transfer mode (ATM) communication system the communication equipment being arranged in a ring circuit system formed of two ring circuits operated in opposite directions, the communications equipment dividing said ring circuit system into ring sections, an active path being established for a respective virtual path over one of the ring circuits and an alternate path for the respective virtual paths being established over the remaining ring circuit, and respective communication equipment establishing a ring loop between the respective active path and the alternate path allocated thereto, comprising the steps of:

placing a respective expanded cell header preceding message cells to be transmitted over the respective virtual path within the respective communication equipment, a path identifier indicating the respective virtual path as well as a sequence number that changes continuously from message cell to message cell of the respective virtual path being contained in said expanded cell header;

respectively retaining a sequence number anticipated as one of a next sequence number and a sequence number that most recently appeared, in communication equipment under the respective path identifier;

in response to at least one of establishment and clear down of a ring loop by one of the communication equipment, forwarding by this communication equipment the first message cell arriving thereafter under the respective path identifier while updating the retained sequence number in the expanded cell header according to a criterion of the sequence number contained in the associated first message cell; and only respectively forwarding message cells, that follow the associated first message cell under the same path identifier, by the respective communication equipment when the sequence number contained in the respective message cell corresponds to one of the sequence number retained under the path identifier and the retained sequence number incremented by 1.

2. The method according to claim 1, wherein a first comparison bit for the individual virtual paths and, a path-independent second comparison bit are retained in the respective communication equipment in addition to said sequence number;

wherein the first comparison bit and the second comparison bit are first uniformly set to a defined logical level;

wherein the second comparison bit is inverted with every establishment and clear down of a ring loop by the respective communication equipment;

wherein the first comparison bit coming into consideration is selected in the respective communication equipment given the appearance of a message cell based on a criterion of the path identifier contained in an associated cell header and is compared to the second comparison bit;

wherein, given a non-identity of the comparison bits that are compared to one another, an associated message cell is evaluated as a first message cell of the respective virtual path and is forwarded while updating the sequence number retained in the respective communication equipment and while setting the logical level of the first comparison bit to the logical level of the second comparison bit; and wherein, given identity of the comparison bits compared to one another, the associated message cell is only forwarded while updating the sequence number retained in the respective communication equipment when the sequence number contained in the associated message cell corresponds to one of the sequence number initially retained under the path identifier and the retained sequence number incremented by 1.

3. The method according to claim 2, wherein the expanded cell headers for the individual, active paths and alternate paths are offered at the respective input of each of the communication equipment; and wherein the path-associated sequence numbers first comparison bits, and the path-independent second comparison bit are retained at a respective output of each of the communication equipment, and wherein comparisons of the comparison bits and sequence numbers are implemented.

4. The method according to claim 3, wherein when active paths are conducted over both ring circuits of the ring circuit system, a marking from which it proceeds whether the respective virtual path is used as an active path or as an alternate path is additionally retained at the respective output of each of the communication equipment for each of the virtual paths, and path-independent loop information for identifying an at least one of established and cleared down ring loop is retained at the respective output of each of the communication equipment;

wherein, given a non-identity of two comparison bits compared to one another and given an established ring loop marked by the loop information, a message cell present at the moment is only handled as a first message cell of the respective virtual path when said virtual path is defined by its marking as an alternate path; and wherein, given a non-identity of two comparison bits compared to one another and given a cleared down ring loop marked by the loop information, a message cell present at the moment is only handled as a first message cell of the respective virtual path when this virtual path is defined by its marking as an active path.

5. The method according to claim 1, wherein the respective communication equipment establishes and in turn clears down a ring loop given a non-availability or, respectively, a re-availability of a ring section connection to the respective communication equipment, establishing or, respectively, in turn clearing down said ring loop under the control of a control means.

6. The method according to claim 1, wherein the respective communication equipment establishes and in turn clears down a ring loop in response to a control signal output by a control means.

7. A circuit arrangement for transmitting message cells over virtual paths that are established between communication equipments of an asynchronous transfer mode (ATM) communication system, the communication equipment being arranged in a ring circuit system formed of two ring circuits operated in opposite directions, the communications equipment dividing said ring circuit system into ring sections, an active path being established for a respective virtual path is established over one of the ring circuits and an alternate path for the respective virtual path being established over the remaining ring circuit, and respective communication equipment establishing a ring loop between the respective active path and the alternate path allocated thereto, comprising:

the communication equipment each respectively having means for providing expanded cell headers such that an expanded cell header, wherein a path identifier identifying the respective virtual path as well as a sequence number varying continuously from message cell to message cell of the respective virtual path, respectively precedes message cells to be transmitted via the respective virtual path within the respective communication equipment;

means for retaining one of a sequence number anticipated next and a sequence number that most recently appeared is in the communication equipment under the respective path identifier;

means for forwarding a first message cell such that in response to at least one of the establishment and clear down of a ring loop by one of the communication equipment, this communication equipment forwards the first message cell arriving thereafter under the respective path identifier while updating the retained sequence number in the expanded cell header based on a criterion of the sequence number contained in the associated, first message cell; and means for only forwarding message cells, that follow the associated first message cell under the same path identifier, by the respective communication equipment when a sequence number contained in the respective message cell corresponds to one of the sequence number retained under the path identifier and the retained sequence number incremented by 1.

8. A method for transmitting message cells over virtual paths that are established between communication equipments of an asynchronous transfer mode (ATM) communication system the communication equipment being arranged in a ring circuit system formed of two ring circuits operated in opposite directions, the communications equipment dividing said ring circuit system into ring sections, an active path being established for a respective virtual path over one of the ring circuits and an alternate path for the respective virtual paths being established over the remaining ring circuit, and respective communication equipment establishing a ring loop between the respective active path and the alternate path allocated thereto, comprising the steps of:

placing a respective expanded cell header preceding message cells to be transmitted over the respective virtual path within the respective communication equipment, a path identifier indicating the respective virtual path as well as a sequence number that changes continuously from message cell to message cell of the respective virtual path being contained in said expanded cell header;

respectively retaining one of a sequence number anticipated as a next sequence number and a sequence number that most recently appeared, in communication equipment under the respective path identifier, and retaining a first comparison bit for the individual virtual paths and a path-independent second comparison bit in the respective communication equipment in addition to said sequence number, the first comparison bit and the second comparison bit being first uniformly set to a defined logical level;

inverting the second comparison bit in response to at least one of the clear down of a ring loop by the respective communication equipment;

selecting the first comparison bit coming into consideration in the respective communication equipment given the appearance of a message cell based on a criterion of the path identifier contained in an associated cell header and comparing the first comparison bit to the second comparison bit;

given a non-identity of the comparison bits that are compared to one another, evaluating the associated message cell as a first message cell of the respective virtual path and forwarding the first message cell while updating the sequence number retained in the respective communication equipment and while setting the logical level of the first comparison bit to the logical level of the second comparison bit; and given identity of the comparison bits compared to one another, an associated message cell is only forwarded while updating the sequence number retained in the respective communication equipment when the sequence number contained in the respective message cell corresponds to one of the sequence number initially retained under the path identifier and the retained sequence number incremented by 1.

9. The method according to claim 8, wherein the expanded cell headers for the individual, active paths and alternate paths are offered at the respective input of each of the communication equipment; and wherein the path-associated sequence numbers first comparison bits, and the path-independent second comparison bit are retained at a respective output of each of the communication equipment, and wherein comparisons of the comparison bits and sequence numbers are implemented.

10. The method according to claim 9, wherein when active paths are conducted over both ring circuits of the ring circuit system, a marking from which it proceeds whether the respective virtual path is used as an active path or as an alternate path is additionally retained at the respective output of each of the communication equipment for each of the virtual paths, and path-independent loop information for identifying at least one of an established and cleared down ring loop is retained at the respective output of each of the communication equipment;

wherein, given a non-identity of two comparison bits compared to one another and given an established ring loop marked by the loop information, a message cell present at the moment is only handled as a first message cell of the respective virtual path when said virtual path is defined by its marking as an alternate path; and wherein, given a non-identity of two comparison bits compared to one another and given a cleared down ring loop marked by the loop information, a message cell present at the moment is only handled as a first message cell of the respective virtual path when this virtual path is defined by its marking as an active path.

11. The method according to claim 8, wherein the respective communication equipment establishes or, respectively, in turn clears down a ring loop given one of a non-availability and re-availability of a ring section connection to the respective communication equipment, establishing and in turn clearing down said ring loop under the control of a control means.

12. The method according to claim 8, wherein the respective communication equipment establishes and in turn clears down a ring loop in response to a control signal output by a control means.

* * * * *